US007451982B2

(12) United States Patent
Kawasaki et al.

(10) Patent No.: US 7,451,982 B2

(45) Date of Patent: Nov. 18, 2008

(54) SHEET MATERIAL INFORMATION DETECTION APPARATUS AND SHEET MATERIAL PROCESSING APPARATUS

(75) Inventors: Takehiko Kawasaki, Kamakura (JP); Norio Kaneko, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 11/769,049

(22) Filed: Jun. 27, 2007

(65) Prior Publication Data

US 2008/0011048 A1 Jan. 17, 2008

(30) Foreign Application Priority Data

Jun. 28, 2006 (JP) ............................ 2006-178771

(51) Int. Cl.
*B65H 7/02* (2006.01)
*G01L 5/04* (2006.01)
*G03G 15/00* (2006.01)

(52) U.S. Cl. ............... 271/265.04; 73/159; 73/862.381; 399/45

(58) Field of Classification Search ................... 73/159, 73/862.381; 271/262, 265.04; 399/45; 356/238.1
See application file for complete search history.

(56) References Cited

U.S. PATENT DOCUMENTS 6,866,263 B2 3/2005 Kawasaki ................... 271/262
7,152,861 B2 12/2006 Kawasaki ................... 271/262
7,212,929 B2 * 5/2007 Kaneko et al. ................ 702/50
7,239,817 B2 7/2007 Kaneko et al. ................ 399/45
7,296,795 B2 * 11/2007 Kawasaki ................... 271/262
7,304,291 B2 * 12/2007 Kawasaki et al. ........... 250/221
7,380,451 B2 * 6/2008 Kawasaki et al. ............. 73/159
7,422,208 B2 * 9/2008 Kawasaki et al. ........... 271/225
2004/0008365 A1 1/2004 Hobbs
2004/0070142 A1 * 4/2004 Kawasaki ................... 271/262
2005/0040587 A1 * 2/2005 Kawasaki ................... 271/100
2005/0087010 A1 * 4/2005 Nojiri et al. ................... 73/159
2005/0271403 A1 * 12/2005 Kaneko et al. ................ 399/44
2006/0016996 A1 * 1/2006 Kaneko et al. ........... 250/339.1
2006/0022400 A1 2/2006 Kawasaki et al. ........... 271/227
2006/0054842 A1 3/2006 Kawasaki et al. ...... 250/559.04

(Continued)

FOREIGN PATENT DOCUMENTS

JP 2002-310866 10/2002

(Continued)

OTHER PUBLICATIONS

U.S. Appl. No. 11/769,081, filed Jun. 27, 2007, Takahiko Kawasaki.

*Primary Examiner*—Edward Lefkowitz
*Assistant Examiner*—Jonathan Dunlap
(74) *Attorney, Agent, or Firm*—Fitzpatrick, Cella, Harper & Scinto

(57) ABSTRACT

A motor rotates a cam, thereby pulling up an external force application member while compressing an application spring. After that, the motor releases the external force application member to impact a sheet material. An impact force caused at a time when an external force receiving member receives an external force application member through the sheet material is detected by a piezoelectric element. When an electric power supply to the motor is stopped, a retraction spring allows the motor to idle through a wheel and rotates the cam to allow the external force application member to retract to a highest position.

10 Claims, 5 Drawing Sheets

U.S. PATENT DOCUMENTS

2006/0139667 A1* 6/2006 Morimoto et al. ............ 358/1.9
2006/0275045 A1 12/2006 Kawasaki et al. ............. 399/45
2006/0276946 A1* 12/2006 Kaneko et al. ................ 701/45
2007/0023996 A1 2/2007 Kawasaki ................... 271/262
2007/0036567 A1 2/2007 Kawasaki et al. ............. 399/45
2007/0200568 A1 8/2007 Shioda et al. ............... 324/640
2008/0001348 A1* 1/2008 Kawasaki et al. ........... 271/259

FOREIGN PATENT DOCUMENTS

JP 2004-038983 2/2004
JP 2005-024550 1/2005

* cited by examiner

SHEET MATERIAL INFORMATION DETECTION APPARATUS AND SHEET MATERIAL PROCESSING APPARATUS

BACKGROUND OF THE INVENTION

1. Field of the Invention

The present invention relates to a sheet material information detection apparatus for detecting information on a sheet material by applying an external force to a sheet material by using an external force application member driven by electric power, and more particularly, to a control in a case where a power down (a supplication amount of the electric power is lowered or stopped) occurs.

2. Description of the Related Art

In recent years, in a technical field of sheet material processing apparatuses, notably image forming apparatuses (such as Laser Beam Printer, copying machine, and ink jet printer), there is diversification of types of sheet materials to be processed. There is also diversification of users and use environment of the sheet material processing apparatus. Only with regard to the image forming apparatus, for the sheet materials of the diversified types, there is an increase in demand for higher quality (higher image quality, higher processing speed) On the other hand, with the diversification of sheet materials and diversification of processing contents, the number of items to be set by the user becomes enormous, thereby making it difficult to set an optimum processing condition. Therefore, a technique, in which various sensors are arranged in the sheet material processing apparatus to automatically identify sheet material information including a size, a thickness, and a quality of the sheet material, and automatically set an optimum processing condition, is put into practical use in some cases.

Japanese Patent Application Laid-Open No. 2004-038983 discloses a system which makes a database of various pieces of sheet material information including texture, glossiness, absorbency of ink, luminance, gross, color reflection, color depth, graininess, whiteness, humidity, heat loss, adhesiveness, and bonding property, for allowing the database to be shared among a plurality of printers. When a sheet material is designated through a setting screen, a requisite piece of sheet material information is taken out from the database to a selected printer. A processing condition optimized based on the sheet material information is automatically set for the printer.

However, even regarding the same kind of sheet material (paper), the sheet material information including a bending modulus and attenuation characteristics of the sheet material widely changes according to temperature, humidity, storage environment, storage time and the like. A database according to Japanese Patent Application Laid-Open No. 2004-038983 handles a fixed value, so it is difficult to comply with a setting regarding fine differences in an environmental condition mentioned above.

In this case, there is proposed that the sheet material information detection apparatus is incorporated in the sheet material processing apparatus, requisite sheet material information is obtained for each sheet material to be processed, and the sheet material information is fed back to a transport condition and processing condition.

Japanese Patent Application Laid-Open No. 2002-310866 discloses a sheet material information detection apparatus having a structure in which, while a sheet material is sandwiched between an impact transmitting block and a piezoelectric element, an external force application member is dropped by gravity, and an impact force transferred to a support member is detected by the piezoelectric element. In this case, compression characteristics of the sheet material are measured as the sheet material information.

However, the sheet material information detection apparatus as disclosed in Japanese Patent Application Laid-Open No. 2002-310866 cannot detect the bending modulus of the sheet material required for setting the transport condition. Further, the heavy external force application member is dropped from a substantially high position in order to compress a large area of the sheet material, so the sheet material information detection apparatus cannot be mounted on a practical sheet material processing apparatus in which the sheet material information detection apparatus is required to be operated at high frequency in a short period of time.

Japanese Patent Application Laid-Open No. 2005-024550 discloses a sheet material information detection apparatus in which an external force application member is allowed to impact a sheet material and an impact force transmitted to an external force receiving member through an intermediation of the sheet material is detected by a piezoelectric element. In this case, a peak value of a voltage output of the piezoelectric element which is deformed is determined, and a bending modulus of the sheet material is output as sheet material information.

Further, in the sheet material information detection apparatus as disclosed in Japanese Patent Application Laid-Open No. 2005-024550, a gram level of the external force application member is allowed to impact the sheet material with travel of a millimeter level, so the sheet material information having practical accuracy can be detected in a short period of time with high frequency.

In the sheet material information detection apparatus as disclosed in Japanese Patent Application Laid-Open No. 2005-024550, through a transport path which is small in width, that is, a gap between the external force application member and the external force receiving member which are opposed to each other and are assembled to be light weight with high accuracy, the sheet material passes at high speed. Accordingly, in a case where the bent or curled sheet material passes therethrough, or where the sheet materials are sent while being overlapped each other (double feeding), the sheet material impact a wall surface of the transport path, the external force application member, or the external force receiving member at high speed, or clogging (also referred to as jam) of the sheet material may be caused. As a result, the external force application member and the external force receiving member may not stay in adjustment in some cases.

Further, in the sheet material information detection apparatus as disclosed in Japanese Patent Application Laid-Open No. 2005-024550, in order to set a height of the sheet material at which the external force application member is allowed to impact the sheet material, a retaining unit for retaining the sheet material in a thickness direction may be provided.

In this case also, there is a possibility of the sheet material impacting a narrow retaining gap of the retaining unit at high speed, or the sheet material clogging.

In this case, there is conceived a retraction control in which the impact and clogging of the sheet material are electrically detected, and the gap between the external force application member and the external force receiving member opposed to each other and the retaining gap are forcibly widened by using a motor or a solenoid.

However, the retraction control depending on electrical detection, electrical control, and electrical driving, exerts a function thereof in a normal time (at a time when electric power is supplied) However, when the electric power is stopped, the gap between the external force application member and the external force receiving member opposed to each other and the retaining gap are not widened. In a case where the moving sheet material is plunged into the gaps which are not widened, there is a risk in that new clogging (jam) or double feeding of the sheet material, and further, damage of sensors or the like may be caused.

Further, in a case where the clogging or double feeding of the sheet material is caused in a position other than the position of the sheet material information detection apparatus, the electrical detection is not performed. Therefore, the gap between the external force application member and the external force receiving member opposed to each other and the retaining gap are not forcibly widened. In a case where, while the sheet material is left in the gaps remaining narrow, a sheet processing apparatus is turned off and the sheet material is forcibly pulled out for recovery, there is a risk of the sheet material which is restrained in the narrow gaps being ripped. On the other hand, when the sheet material is not ripped, the external force application member and the external force receiving member are strained when the sheet material is pulled out, so the external force application member and the external force receiving member do not stay in adjustment.

SUMMARY OF THE INVENTION

It is an object of the present invention to provide a sheet material information detection apparatus in which a gap between an external force application member and an external force receiving member which are opposed to each other is forcibly widened quickly even in a case where a power source is turned off due to some reason (abnormality), thereby enabling easy removal of a sheet material.

A sheet material information detection apparatus according to the present invention, includes: an external force application member for applying an external force to a sheet material; an external force receiving member for receiving the external force through an intermediation of the sheet material; a driving unit, to which an electric power is supplied, for driving the external force application member; and a gap control mechanism for widening a gap between at least one of the external force application member and the external force receiving member, and the sheet material when the electric power is reduced.

A sheet material information detection apparatus according to the present invention, includes: an external force application member for applying an external force to a sheet material; an external force receiving member for receiving the external force through an intermediation of the sheet material; a driving unit, to which an electric power is supplied, for driving the external force application member; a retaining unit for retaining the sheet material in a thickness direction by at least one of an upstream side and a downstream side of the external force application member; and a gap control mechanism for widening a gap between the sheet material and the retaining unit when the electric power is reduced.

In the sheet material information detection apparatus according to the present invention, an impact is applied to the sheet material by the electric power supplied to the driving unit in a space between the external force application member and the external force receiving member to detect information on the sheet material. During this period, the sheet material is restrained by the sheet material information detection apparatus. In the present invention, the “restraint of the sheet material” includes an impact application operation for detecting information. When the electric power is reduced due to some reason, there is provided a gap control mechanism for releasing restraint of the sheet material in the gap.

When the electric power supplied to the driving unit is reduced, the gap control mechanism releases the restraint of the sheet material in the gap between the external force application member and the external force receiving member regardless of presence/absence of the sheet material. The releasing includes not only to widen the gap but also to weaken a restraint pressure. The releasing does not depend on electrical detection, electrical control, and electrical driving. Therefore, when the electric power supply to the driving unit is stopped, the gap between the external force application member and the external force receiving member can be quickly widened. Not only in a case where the electric power supply to the driving unit is stopped, but also in a case where the electric power supply in an overall apparatus, an overall system, an overall plant, or an overall area is stopped, as long as the electric power supply to the driving unit is stopped, the restraint of the sheet material can be released.

By forcedly releasing the restraint, there is reduced a risk in that the sheet material, which plunges into the gap between the external force application member and the external force receiving member at the time of the electric power stop, clogs therein, or the sheet materials are fed while overlapping each other. When the transportation is resumed, the sheet material can escape from the narrow transport path having the gap formed by the external force application member and the external force receiving member. There will be no case where, in the sheet material information detection apparatus in which the electric power supply has been stopped, the sheet material remains in the transport path having the narrow gap.

Even in a case where the sheet material is not automatically delivered, the restraint of the sheet material is released, so the sheet material can be easily drawn out from front and back of the transport path. Further, in the case of drawing out, the members forming the gap and the sheet material will not be strained. If the sheet material is drawn out in a rough manner, the sheet material is hardly ripped, and there are few cases where the external force application member and the external force receiving member go out of alignment. Further, the external force application member, the external force receiving member, the sensor, and the like can be prevented from being damaged.

In the sheet material information detection apparatus according to the present invention, the sheet material is restrained by an electric power supplied to the driving unit, in the gap where the sheet material is retained by the retaining unit. According to another invention, the “restraint of the sheet material” includes an impact application operation for detecting information. There is provided a gap control mechanism for releasing restraint of the sheet material in the gap when the electric power is reduced.

The gap control mechanism releases, when the electric power supplied to the driving unit is reduced, the restraint of the sheet material in the gap where the sheet material is retained by the retaining unit regardless of the presence/absence of the sheet material. The releasing includes not only to widen the gap but also to weaken the restraining pressure. The gap control mechanism releases the gap without depending on the electric power. Therefore, even in a case where the important electric power supply is stopped, the gap is quickly widened and the restraint of the sheet material by the gap is effectively released.

Accordingly, there is reduced a risk of the sheet material which has plunged into the gap causing a jam or double feeding of the sheet materials. As long as the transportation is resumed, a possibility of the sheet material escaping from the gap increases. Even in the case where the sheet material is not automatically delivered, the sheet material can be easily drawn out from the front and back of the transport path. Further, when the sheet material is drawing out, the members constituting the retaining unit are not strained.

Further features of the present invention will become apparent from the following description of exemplary embodiments with reference to the attached drawings.

DESCRIPTION OF THE EMBODIMENTS

Figure 1:
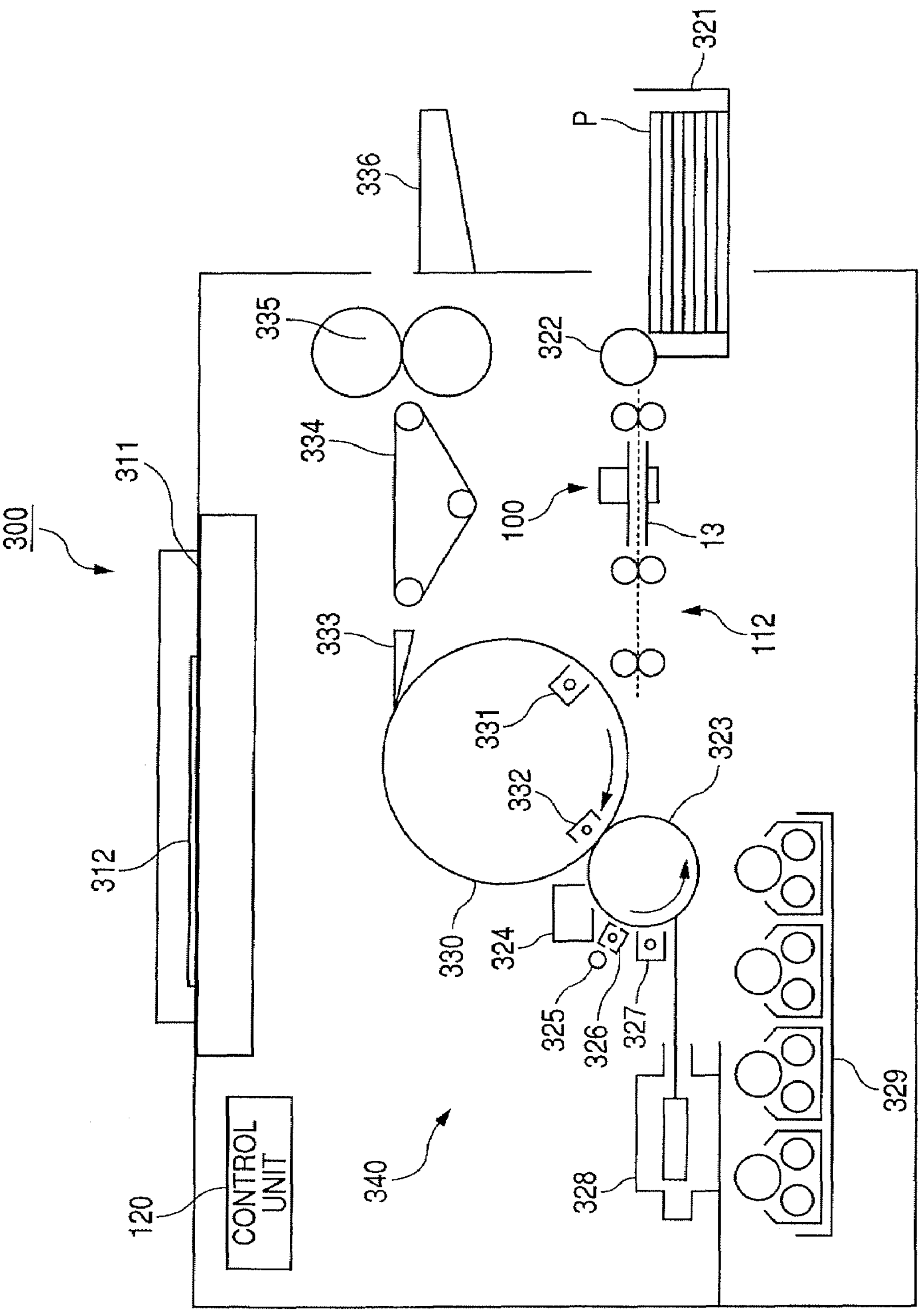
FIG. 1 is an explanatory diagram of a structure of an image forming apparatus.

Hereinafter, a detailed description will be made of a sheet material information detection apparatus according to an embodiment of the present invention with reference to the drawings. The sheet material information detection apparatus according to the present invention is not limited to a limitative structure according to embodiments described below. As long as an external force application member is received by an external force receiving member through an intermediation of a sheet material, another embodiment may be achieved, in which a part or a whole of structures of the embodiments may be replaced with an alternative structure.

In this embodiment, a description is made of an example in which the sheet material information detection apparatus 100 is mounted on an electrostatic image forming apparatus 300. However, the sheet material information detection apparatus 100 may be mounted on an ink jet image forming apparatus, various printing devices, various sheet material processing apparatus, such as a sheet material processing device, a sheet material stacking devices, a sorter.

Note that, the structure, operation, control, operation principle of the sheet material information detection apparatus, signal processing, and the like of the image forming apparatus disclosed in each of the patent documents described above will not be illustrated in the drawings and descriptions thereof will also be omitted.

Embodiment 1

Figure 2:
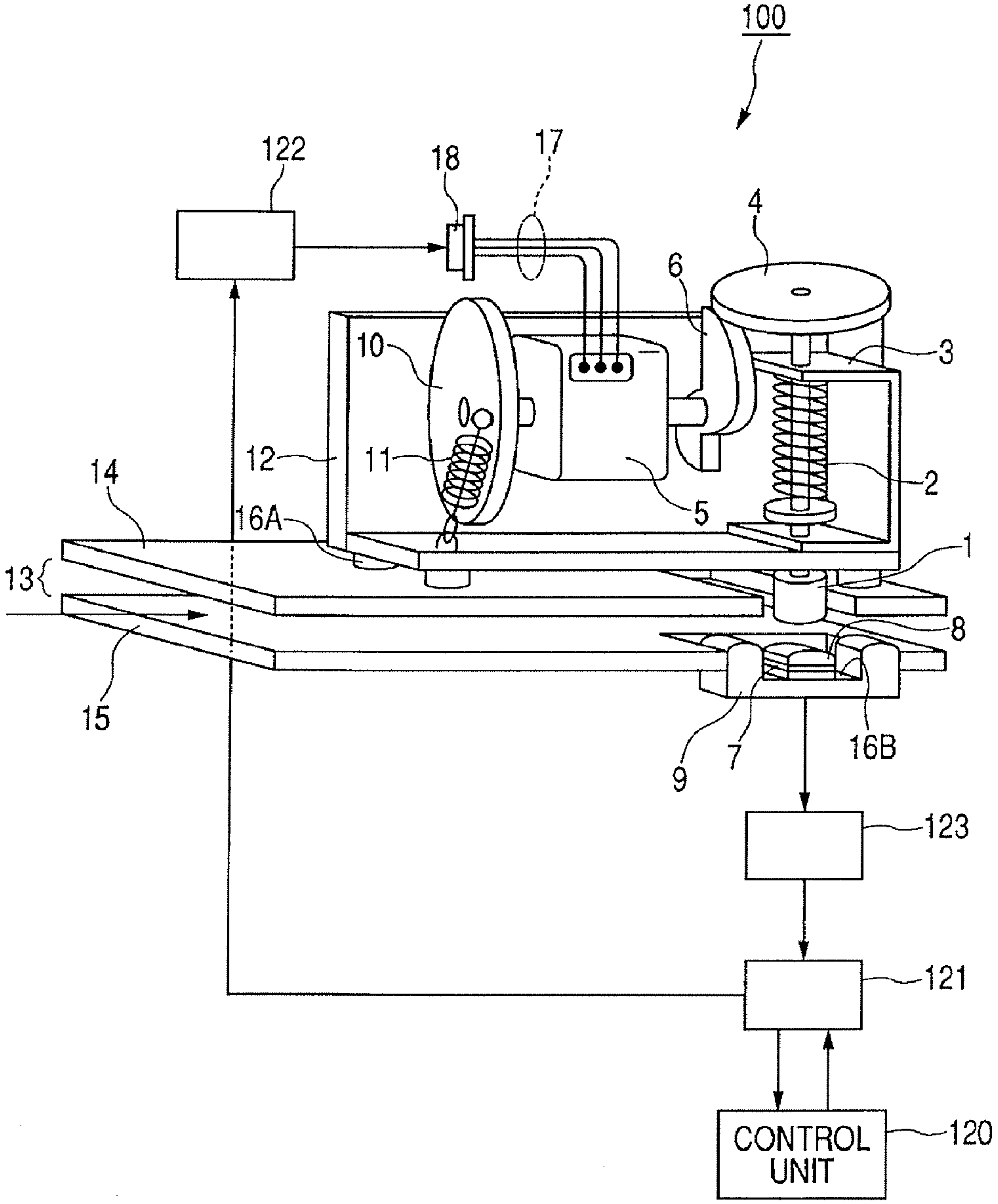
FIG. 2 is an explanatory view of a structure of a sheet material information detection apparatus according to Embodiment 1 of the present invention.
Figure 3:
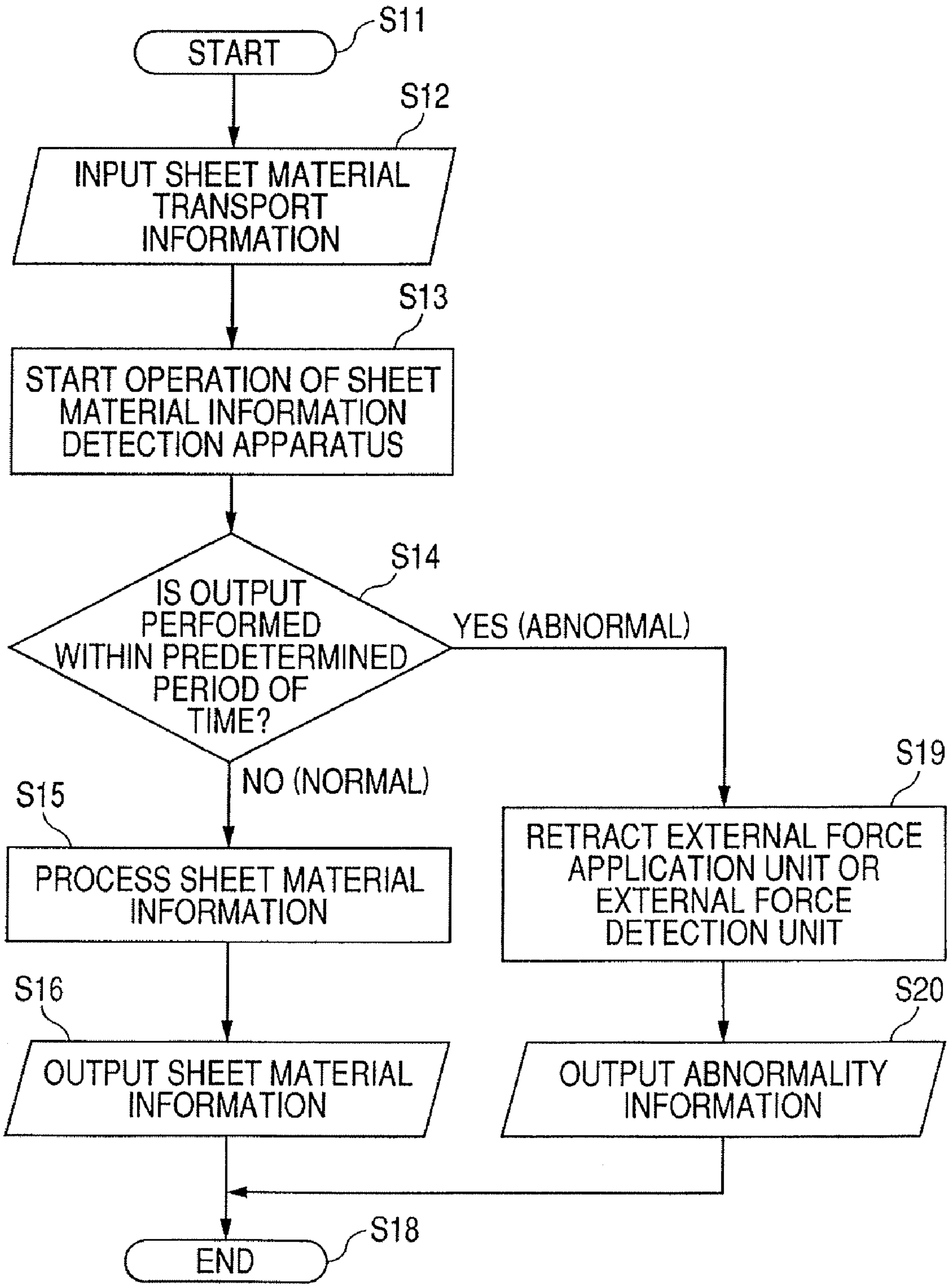
FIG. 3 is a flow chart for illustrating an operation of the sheet material information detection apparatus.

FIG. 1 is an explanatory diagram of a structure of an image forming apparatus. FIG. 2 is an explanatory view of a structure of a sheet material information detection apparatus according to Embodiment 1 of the present invention. FIG. 3 is a flow chart illustrating separation of the sheet material information detection apparatus.

As illustrated in FIG. 1, the image forming apparatus 300 is a color copying machine for performing image formation on a sheet material P by an image formation process portion 340. A reading unit 311 reads image information of a color original 312. The read information is converted into different color signals corresponding to four colors of toner, which are cyan, magenta, yellow, and black.

On the other hand, the sheet material P accommodated in a cassette 321 is sent to a transporting portion 112 by a transmission roller 322. In a position adjacent to the transporting portion 112, there is provided the sheet material information detection apparatus 100 of Embodiment 1. The sheet material information detection apparatus 100 is arranged so as to sandwich, from above and below, a transporting position 13 of the sheet material P, being passed from the transmission roller 322 to the transporting portion 112. The sheet material information detection apparatus 100 detects sheet material information (mechanical property) of the sheet material P passing through the transporting position 13.

A control section 120 identifies the sheet material information on the sheet material P detected by the sheet material information detection apparatus 100 before the image formation is performed by the image formation process portion 340, and sets an optimum transporting condition, transfer condition or fixing condition.

Next, the sheet material P is sent to the drum 330 from the transporting position 13 to the transporting portion 112. A peripheral surface of the drum 330 is provided with a dielectric sheet. The sheet material P is sucked and carried on a surface of the drum 330 charged by a suction corona discharger 331. After that, due to an action of the suction corona discharger 331, a toner image on a photosensitive drum 323 is transferred to a sheet material P.

A surface of the photosensitive drum 323 is cleaned by a blade cleaner 324. A pre-exposure lamp 325 and a front static eliminator 326 eliminate an effect remaining on a photosensitive member surface layer due to the last image formation. Next, a surface of the photosensitive drum 323 is uniformly charged by a primary charger 327. A charge amount at this time is determined based on the sheet material information on the sheet material P.

A laser beam scanner 328 scans the surface of the photosensitive drum 323 to form an electrostatic latent image based on the different color signals of the color original 312 obtained by reading. A developing device 329 includes developing units of four colors, which are cyan, magenta, yellow, and black. The developing units corresponding to respective colors successively move to a position directly below the photosensitive drum 323 to develop the latent image on the photosensitive drum 323 to a toner image.

The sheet material P is sucked and carried on the transfer device drum 330 until the toner image of four colors is successively transferred. After that, the sheet material P is separated from the transfer device drum 330 by an action of a separation claw 333. The separated sheet material P is sent to a heating roller fixing device 335 by a conveyor belt 334 and heat and pressure are applied thereto, so a toner image is fixed onto a surface of the sheet material P. A fixing temperature at this time is determined based on sheet material information on the sheet material P.

The sheet material P after completion of the fixation is delivered onto a tray 336. Toner remaining on the surface of the photosensitive drum 323 after completion of the transfer is cleaned by the blade cleaner 324, and a process advances to a next image formation cycle.

As shown in FIG. 2, in the sheet material information detection apparatus 100, when the power supply to the motor 5 is stopped to release polarization of the motor 5 (stepping motor), a retraction spring 11 forcibly rotates a wheel 10, thereby allowing an external force application member 1 to a highest position. In Embodiment 1, retraction of the external force application member 1 when the electric power supply is stopped is performed by returning of the retraction spring 11 which is disengaged with a latch (catch), so the retraction does not depend on the electrical detection, electrical control, and electrical driving. FIG. 2 schematically illustrates a state where the external force application member 1 of the sheet material information detection apparatus 100 in a retracted state.

An external force application mechanism for applying an external force to the sheet material P includes the external force application member 1, the application spring 2, a bearing 3, a plate 4, the motor 5, and a cam 6. The motor 5 is a stepping motor and is supplied with an electric power through a driver 122, a connector 18, and a wiring 17, thereby driving the external force application member 1.

The cam 6 is fixed to an end of an output shaft of the motor 5. The motor 5 rotates the cam 6 to push up the plate 4 against a bias force of the application spring 2 to move the external force application member 1 to a putting out position. After that, the cam 6 releases the external force application member 1 and subjects the external force application member 1 to the bias of the application spring 2. A distal end portion of the external force application member 1 which is biased by the application spring 2 to be accelerated applies an external force to the sheet material. A control circuit 121 controls a driver 122 to rotate the motor 5 and puts out the external force application member 1 through compression and release of the application spring 2 using the cam 6 to apply the external force to the sheet material.

The wheel 10 is fixed to the other end of the output shaft of the motor 5. The retraction mechanism for retracting the external force application member 1 to the highest position includes the wheel 10 and the retraction spring 11. The retraction spring 11 biases the wheel 10 to be at a rotational angle at which the external force application member 1 is positioned in a retraction position. The external force application mechanism and the retraction mechanism are fixed to a housing 12. The housing 12 is attached to a first transport guide 14 through the intermediation of dampers 16A.

The external force application member 1 put out by being biased by the application spring 2 is received by an external force receiving mechanism through the intermediation of the sheet material. The external force application mechanism includes an external force receiving member 8, a piezoelectric element 7, a damper 16B, and a support member 9. The external force receiving member 8 receives the external force application member 1 through the intermediation of the sheet material. Between the external force receiving member 8 and the damper 16B, the piezoelectric element 7 for detecting an impact force received by the external force receiving member 8 is sandwiched and is fixed thereto in an integrated manner. The damper 16B is fixed to the support member 9 and the support member 9 is fixed to a second transport guide 15 through a vibration prevention mechanism (not shown)

The first transport guide 14 and the second transport guide 15 are opposed to each other to form a transport path 13. In a process in which the sheet material is transported in the transport path 13 and passes the support member 9, the external force application member 1 is put into the sheet material. The external force applied by the external force application member 1 which is put in is received by the external force receiving member 8 through the intermediation of the sheet material, and an impact force when the external force receiving member 8 receives the external force is detected by the piezoelectric element 7.

A converting portion (charge amplifier) 123 converts a capacity change due to deformation of the piezoelectric element 7 to a change in the voltage signal. The control circuit 121 detects a peak value of a voltage signal output by the conversion portion 123 to take out the sheet material information. The sheet material information corresponds to the peak value of the impact force detected through the intermediation of the sheet material P and reflects mechanical characteristics and a moisture amount of the sheet material P.

When the power supply to the motor 5 is stopped, the sheet material information detection apparatus 100 according to Embodiment 1 of the present invention uses a driving force generated by the retraction spring 11 to retract the external force application member 1. For the motor 5, there is adopted a stepping motor which loses a retention force when the power supply is stopped. In the motor 5, while electric power is supplied from the driver 122, a stator polarizes a rotor, thereby generating the retention force for rotation.

To a point on a periphery of the wheel 10 for forcibly rotating the output shaft of the motor 5, an end of the retraction spring 11 is fixed so as to freely rotate, and the other end of the retraction spring 11 is fixed to a point of the housing 12 so as to freely rotate. The motor 5 to which electric power is supplied rotates and stops while keeping a retention force, and functions as a drive source for external force application described above. However, when the supply of electric power is stopped, the motor 5 loses the retention force. Therefore, due to the bias force of the retraction spring 11, the wheel 10 rotates in a predetermined direction to allow the motor 5 to idle. The idling of the motor 5 allows the cam 6 to rotate to pull up the plate 4 to a position where the cam 6 antagonizes a force generated by compression of the application spring 2, and allows the external force application member 1 connected to the plate 4 to retract upwardly. As a result, a gap between a distal end of the external force application member 1 and the sheet material is widened, thereby quickly releasing restraint of the sheet material.

In the present invention, the distance at a normal state between the distal end of the external force application member 1 and the sheet material may be, for example, 1 mm to 30 mm at a neutral position (the initial position of the external force application member 1). The distance at a retracted state is preferably 1 mm or more, more preferably 10 mm or more. The possibility that the external force application member 1 comes into contact with the sheet material reduces when the distance at a retracted state comes to be wider. Therefore, the distance at a rectracted state has no upper limit.

The external force application member 1 has a structure in which the distal end portion (a side brought into contact with the sheet material P), a shaft portion, and the plate 4 brought into contact with the cam described later are integrated with each other. The distal end portion is made of a stainless steel material, and a contact surface thereof with respect to the sheet material is spherically machined to have a radius of 20 mm. A mass of the external force application member 1 as a whole including the shaft and the plate 4 is 4 g.

The external force application member 1 is retained at the shaft portion thereof by the bearing 3 so as to be movable in a linear direction. Motion is imparted to the external force application member 1 through expansion and compression of the application spring 2 by the cam 6. The bearing 3 is made of a fluorinated resin as an example of a resin material having low frictional resistance.

The motion of the external force application member 1 is controlled through rotation of the cam 6 by the motor 5. The motor 5 rotates the cam 6 by a required angle in a process of rotating the cam 6 from a predetermined stop position, and stops the cam 6. After that, the motor 5 returns the cam 6 to the initial stop position. The cam 6 repeats compression/releasing of the application spring 2 twice in a process of one rotation while being driven by the motor 5. The external force application member 1 is accelerated to a predetermined speed with a restoring force of the application spring 2 and impacts the sheet material to apply an external force thereto.

An impact speed in a first external force application is 0.5 m/sec, and an impact speed in a second external force application is 0.2 m/sec. For a rotation control of the motor 5, in order to wait for attenuation of unnecessary vibration of the application spring 2 or the external force application member 1, which are generated by driving of the motor 5, there is performed a process of temporarily suspending the rotation. Further, the initial stop position of the cam 6 is the vicinity of such an angular position that the application spring 2 is compressed to a maximum degree during one rotation of the cam 6, that is, such a position that the external force application member 1 is spaced apart from the sheet material to a maximum degree.

An operation from a time point when the rotation of the cam 6 is started at the stop position set as described above to a time point when the cam 6 returns to the stop position again after two times of external force application is one cycle. The one cycle is started after a predetermined period of time from reception of a signal of a sheet material passage detection sensor (not shown). A time period required for one cycle is 0.2 seconds, a time interval between two times of external force application is 0.1 seconds.

The external force receiving member 8 is arranged in a position where the external force receiving member 8 opposes the external force application member 1 through the intermediation of the sheet material. The piezoelectric element 7 is bonded to the external force receiving member 8. The damper 16B inserted between the piezoelectric element 7 and the support member 9 eliminates unnecessary vibration transmitted from the support member 9 to the piezoelectric element 7. For the piezoelectric element 7, lead zirconate titanate (PZT) ceramics is adopted. For the external force receiving member 8, a stainless steel material is adopted.

Between sheet material support surfaces of the support member 9 and an external force application member receiving surface of the external force receiving member 8, there is provided a predetermined step structure. Each of those surfaces is provided with an arcuate chamfer for realizing smoother insertion of the sheet material.

The step structure forms a space for allowing deflection of the sheet material. The sheet material is deflected by an amount of the step and is then brought into contact with the external force receiving member. As a result, a deflection rigidity that is one of the sheet material characteristics is reflected on an output signal. Even in a case where other various characteristics of the sheet material are the same, the larger the deflection rigidity of the sheet material is, the more the external force application member 1 decelerates. Therefore, the external force attenuates and is detected by the piezoelectric element 7.

The sheet material brought into contact with the external force receiving member 8 through the deflection process is then sandwiched between the external force receiving member 8 and the external force application member 1 to receive a compression force. As a result, compression characteristics of the sheet material are reflected on the output signal of the piezoelectric element 7. Even in a case where other various characteristics of the sheet material are the same, the higher an impact absorption due to compression of the sheet material is, the more the external force application member 1 decelerates. Therefore, the external force attenuates and is detected by the piezoelectric element 7.

The sheet material information detection apparatus 100 according to Embodiment 1 of the present invention detects sheet material information according to a flow chart of FIG. 3. The flow chart of FIG. 3 illustrates a control in a case where the image forming apparatus 300 (FIG. 1) operates normally. In a case where electric power is not supplied to the sheet material information detection apparatus 100 due to a failure or the like of the power supply to the image forming apparatus 300, the external force application member 1 is initially in a retracted state, so a description thereof will be omitted.

First, in the image forming apparatus 300 (FIG. 1), in response to starting of an operation of the sheet material processing, the operation of the sheet material information detection apparatus 100 is started (S11).

Subsequently, sheet material transport information is input to the control circuit 121 of the sheet material information detection apparatus 100 (S12). The sheet material transport information is information related to a position and a speed of the sheet material, and means a timing at which the sheet material passes the sheet material information detection apparatus 100. The sheet material transport information is obtained by processing information on a signal of the sheet material passage detection sensor of the image forming apparatus 300 or an operation start of the image forming apparatus 300 (state where a copy button is pressed). According to the sheet material transport information, a timing of the operation (such as external force application) of the sheet material information detection apparatus 100 is determined.

Subsequently, in response to the reception of the sheet material transport information, the control circuit 121 starts an operation of sheet material information detection (S13). The sheet material passage detection sensor (not shown) arranged on an upstream side of the transport path 13 detects passage of the sheet material P, and after a certain period of time has elapsed, a signal of starting the operation is sent from the control circuit 121 to the driver 122. The control circuit 121 rotates the motor 5 to drive the external force application member 1, and releases the external force application member 1 to impact the sheet material P.

Further, after the start of the operation, the control circuit 121 determines whether or not there is an output from the piezoelectric element 7 at a level higher than a threshold level in a predetermined period of time (S14). The predetermined period of time is set by adding some delay to a time period in which the external force application member 1 completes one cycle. In Embodiment 1, the predetermined period of time is set to be 0.3 seconds.

In a case where there is the output at a level higher than the threshold level within 0.3 seconds (YES in S14), a sheet material information processing is performed with respect to the output (S15), the resultant is output as the sheet material information (S16), and one cycle of the operation of the sheet material information detection ends (S18). A control section 120 of the image forming apparatus 300 sets a transport condition and a processing condition for the sheet material based on the sheet material information received from the control circuit 121.

However, in a case where there is no output at a level higher than the threshold level within 0.3 seconds (NO in S14), the control circuit 121 stops the electric power supply to the motor 5 through the driver 122 (S19). As a result, the external force application member 1 is automatically retracted upwardly, and the gap between the external force application member 1 and the support member 9 which are opposed to each other is released. As a result, the restraint of the sheet material P is released.

Further, abnormality information indicating that the sheet material information detection apparatus is in an abnormal state is output (S19). The abnormality information is sent to the control section 120 as a part of the sheet material information, and is used for an appropriate recovery process for the image formation apparatus 300. For example, the information can be displayed on a touch panel of the image forming apparatus 300 as failure information, or can be sent to an appropriate PC connected thereto, maintenance asking destination, or the like through a network.

Note that, the reason for the abnormality is determined in consideration with also information from other sensors provided to the image forming apparatus 300. For example, when, although abnormality is sensed by the sheet material information detection apparatus 100, both the sheet material passage detection sensors on upstream and downstream sides of the transport path 13 sense passage of the sheet material, the control section 120 determines that the sheet material information detection apparatus 100 is in an abnormal state. However, when, although the sheet material passage detection sensor on the upstream side senses the passage of the sheet material, the sheet material passage detection sensor on the downstream side does not sense the passage thereof, the control section 120 determines that clogging of the sheet material occurs.

In Embodiment 1, the control circuit 121 intentionally cuts off the electric power supply to the motor 5, thereby retracting the external force application member 1. The stopping of the electric power supply to the motor 5 is one of control outputs performed by the control circuit 121 which is normally operated. The electric power supply to the motor 5 also serves as an actuator for recovering the sheet material information detection apparatus 100 to a normal state. However, in cases where the electric power supply to the control circuit 121 stopped, where the electric power supply to the sheet material information detection apparatus 100 including the control circuit 121 is stopped, and where the electric power supply to the image forming apparatus 300 is stopped, the electric power supply to the motor 5 is stopped. In a case where other elements such as a control circuit etc. or wirings are provided in a middle of an electric power supply system, failure of those elements stops the electric power supply to the motor 5. Representative examples of the failure includes:

(1) breakage of a control electric power supply line to the driving unit or deciduation of a connector;

(2) failure of the control circuit for controlling electricity of the driving unit;

(3) power outage or malfunction of the power source; and (4) power off.

In an accidental abnormal state where the power supply to the sheet material information detection apparatus 100 is cut off due to the above-mentioned troubles, the external force application member 1 is quickly retracted to release the restraint of the sheet material. As a result, the sheet material information detection apparatus, peripheral members, and the sheet material itself are hardly damaged by a force of the sheet material which is transported at high speed. While a damage of the mechanism and the peripheral members of the sheet material information detection apparatus 100 is avoided, the sheet material information detection apparatus 100 can detect the sheet material information with high reproducibility for a large amount of sheet materials which are transported at high speed. In the image forming apparatus 300, an appropriate and high-speed sheet material processing can be performed.

Embodiment 2

Figure 4A:
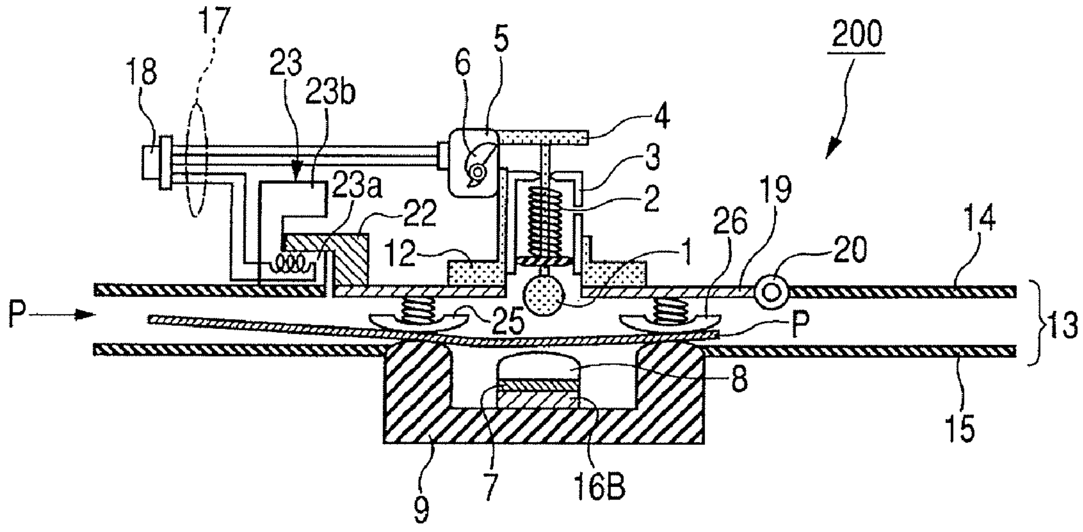
FIGS. 4A and 4B each are an explanatory view of a structure of a sheet material information detection apparatus according to Embodiment 2 of the present invention.
Figure 4B:
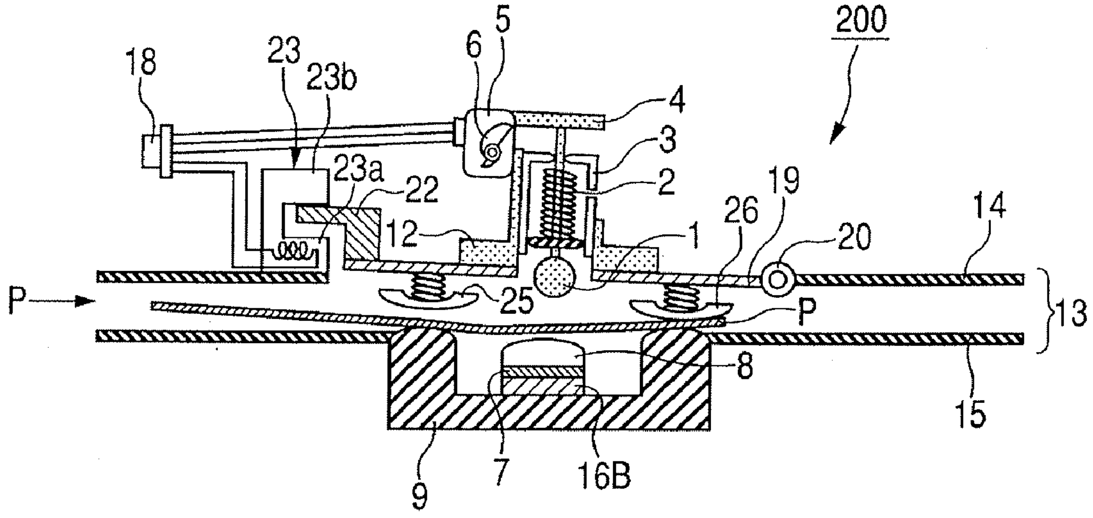

FIGS. 4A and 4B are each an explanatory view of a structure of a sheet material information detection apparatus according to Embodiment 2 of the present invention. FIG. 4A shows a normal state. FIG. 4B shows a retracted state. According to Embodiment 2, in place of the sheet material information detection apparatus 100, a sheet material information detection apparatus 200 is mounted on the image forming apparatus 300 shown in FIG. 1. The sheet material information detection apparatus 200 releases a latch of an electromagnet, thereby allowing sheet material pressers 25 and 26 to retract upwardly together with the external force application member 1. Other constructions, attachment, control, and the like are the same as those of the sheet material information detection apparatus 100 according to Embodiment 1. Therefore, in FIGS. 4A and 4B, structures as those of FIG. 2 are denoted by the same reference symbols and detailed descriptions of those will be omitted.

As shown in FIG. 4A the external force application mechanism for applying the external force to the sheet material P includes the external force application member, the application spring 2, the bearing 3, the plate 4, the motor 5, and the cam 6. The motor 5 is supplied with electric power from an outside, and rotates the cam 6 to drive the external force application member 1. The cam 6 allows the application spring 2 to be compressed and to lift up the external force application member, and then releases the application spring 2, thereby allowing the external force application member 1 to impact the sheet material P.

The external force application mechanism is fixed to the housing 12, and the housing 12 is fixed to a fixed plate 19. The fixed plate 19 is attached to the first transport guide 14 constituting the transport path 13 for the sheet material P through the intermediation of a hinge 20 including a helical torsion spring (not shown). The helical torsion coil spring of the hinge 20 biases the fixed plate 19 such that a "flipped state" illustrated in FIG. 4B is achieved.

To the external force receiving member 8 for receiving the external force applied by the external force application member 1 through the intermediation of the sheet material, the piezoelectric element 7 is bonded and fixed. The piezoelectric element 7 is fixed to the support member 9 through the intermediation of the damper 16B. The support member 9 is fixed to the second transport guide 15 arranged so as to oppose the first transport guide 14.

The sheet material pressers 25 and 26 are attached to the fixed plate 19 so as to oppose a sheet material supporting surface of the support member 9. The sheet material pressers 25 and 26 and the support member 9 constitute a retaining mechanism for suppressing flapping of the sheet material which is transported and setting a height of the sheet material P at the time when the external force application member 1 impacts the sheet material P.

The sheet material pressers 25 and 26 bias, by springs included therein, a metal member having a curved surface such that an impact shock due to the impact caused through transportation of the sheet material P is dissipated, and press the sheet material P to the support member 9.

The sheet material P is transported in the transport path 13 and is retained between the sheet material presser 25 and 26 and the support member 9. In this state, the external force application member 1 applies the external force to the sheet material P and the piezoelectric element 7 detects the external force detected by the external force receiving member 8 through the intermediation of the sheet material P.

The fixed plate 19 is latched in a holizontal state illustrated in FIG. 4A by a latch 23 and a fitting 22. The key fitting is made of magnetic metal and is fixed to the fixed plate 19. The latch 23 is a resin member of a square U-shape, having an electromagnet for latching the key fitting 22, embedded in a lower portion of the resin member. An upper portion of the resin member functions as a stopper. The latch 23 is fixed to the first transport guide 14. Electric power to the electromagnet of the latch 23 is supplied from the wiring 17 through the connector 18 interlockingly with the electric power supply to the motor 5.

As shown in FIG. 4A, in a case where the motor 5 is supplied with electric power, the electromagnet of the latch 23 is turned on, so the key fitting 22 is sucked and retained by the lower portion of the latch 23. However, when the electric power supply to the motor 5 is stopped, the electromagnet of the latch 23 is turned off interlockingly therewith. Therefore, the retention of the key fitting 22 is released. As a result, as shown in FIG. 4B, the fixed plate 19 rotates to be flipped to a position where the fitting 22 abuts on the upper portion of the latch 23, and the external force application member 1 and the sheet material pressers 25 and 26 retract upwardly to release restraint of the sheet material P. In Embodiment 2, the retraction spring 11 shown in FIG. 2 may be separately provided to serve as a support for retraction.

As described above, in the sheet material information detection apparatus 200, when the electric power supply to the motor 5 is cut off, the external force application member 1 and the sheet material pressers 25 and 26 are allowed to retract to release the restraint of the sheet material P. When the electric power supply to the sheet material information detection apparatus 200 is cut off, the restraint of the sheet material is also released in the same manner. As a result, a trouble such as damages of the sheet material information detection apparatus 200 and the peripheral members can be avoided. Therefore, in the image forming apparatus 300, an appropriate sheet material processing can be performed. When the electric power supply to the motor 5 is resumed, the electromagnet of the latch 23 is turned on, thereby returning the fixed plate 19 from the upper portion of the latch 23 to the lower portion thereof. As a result, without performing a manual recovery process, sheet material information detection and image formation in the normal state illustrated in FIG. 4A are resumed. The latch mechanism and the stopper enables more effective retraction position control.

Embodiment 3

Figure 5:
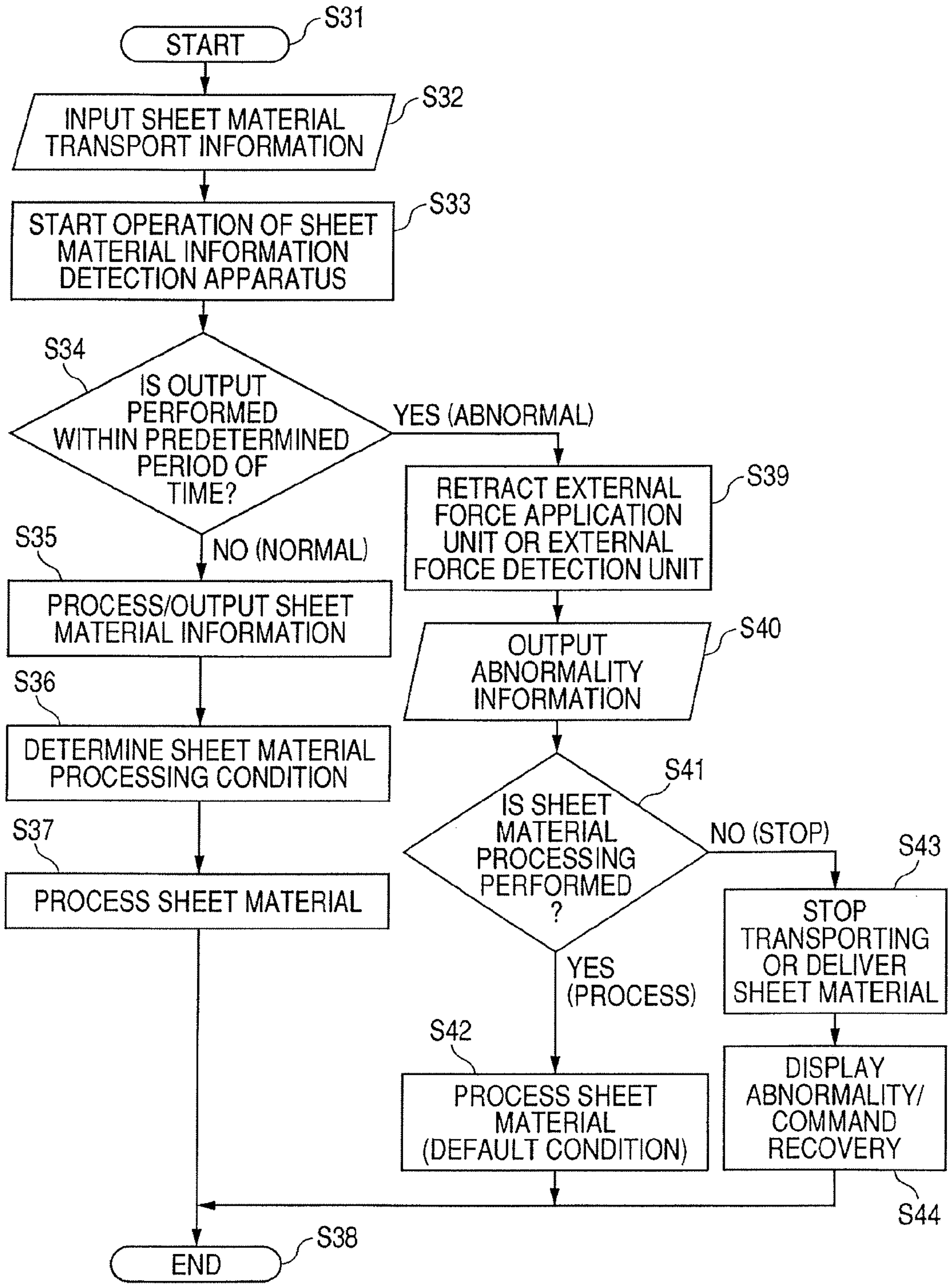
FIG. 5 is a flow chart of a control in a sheet material processing apparatus according to Embodiment 3 of the present invention.

FIG. 5 is a flow chart of a control in a sheet material processing apparatus according to Embodiment 3 of the present invention. In the image forming apparatus 300 shown in FIG. 1, when abnormality information is received from the sheet material information detection apparatus 200 according to Embodiment 2, the sheet material information received from the sheet material information detection apparatus 200 is abandoned. Next, a preset default transport condition and processing condition are set for the image forming apparatus 300, and image formation is then performed.

As shown in FIG. 5, the control section 120 of the image forming apparatus 300 starts an image forming operation to start transporting a sheet material (S31). Starting of the image forming operation is performed by a user (operator) of the image forming apparatus 300 pressing a start button on an apparatus main body, by sending a processing command from peripheral equipment such as an external computer or a camera or connected thereto. In response to the starting of the image forming operation in the image forming apparatus 300, an operation of the sheet material information detection apparatus 200 is also started.

Next, sheet material transport information is input to the control circuit 121 of the sheet material information detection apparatus 200 (S32). The sheet material transport information is information related to a position and a speed of the sheet material P, and means a timing at which the sheet material P passes the sheet material information detection apparatus 200. In response to the sheet material transport information, the control circuit 121 starts the sheet material information detection operation by the sheet material information detection apparatus 200 (S33).

Depending on whether or not there is an output within a predetermined time after the starting of the sheet material information detection operation (S34), the subsequent flow differs. In a case where there is an output within the predetermined time (YES in S34), the sheet material information is detected by the sheet material information detection apparatus 200 (S35). Subsequently, the control section 120 determines a sheet material processing condition based on the sheet material information (S36), and based on the determined sheet material processing condition, an image forming processing is performed (S37). After this process, the operation ends (S38).

However, in a case where there is no output within the predetermined time (NO in S34), the electric power supply to the motor 5 of the sheet material information detection apparatus 200 is stopped. As a result the external force application member 1 and the sheet material presser 25 and 26 are automatically retracted upwardly (S39).

Subsequently, since there is no output, the abnormality is determined, and the control circuit 121 of the sheet material information detection apparatus 200 outputs the abnormality information to the control section 120 of the image forming apparatus 300 (S40). The control section 120 which has received the abnormality information determines that the abnormality is serious or minor (S41).

In a case where the abnormality is determined to be minor (YES in S41), the sheet material processing is not necessarily suspended, the control section 120 performs the image forming processing under the default condition after stopping the operation of the sheet material information detection apparatus 200. The determination that the abnormality is minor is made in a case where the normal transportation of the sheet material P is recognized or where the abnormality accidentally occurs at a low rate in the repetitive sheet material processings.

However, in a case where an effect of the abnormality is assumed to be great (NO in S41), the control section 120 suspends the sheet material processing. In the suspension of the sheet material processing, the transport of the sheet material is stopped or the sheet material is delivered (S43), and the abnormality of the sheet material processing apparatus is displayed and recovery is commanded appropriately (S44). Further, the control section 120 determines the effect with respect to the subsequent sheet material processing as needed, and an appropriate processing is performed. After this process, the operation ends (S38).

According to the control of the image forming apparatus 300 of Embodiment 3, even in a case where the abnormality occurs in the sheet material information detection apparatus 200, a trouble can be avoided, and an appropriate image forming process can be performed.

(Modified Example of Sheet Material Information Detection Apparatus)

In the above embodiments, examples of the sheet material may include paper (normal paper, glossy paper, coat paper, recycled paper, or the like), a film made of a resin etc, and an OHT sheet, and the sheet material mainly refers to a sheet-like image recording medium. A shape of the sheet material may be any shape such as one obtained by being cut into predetermined dimensions (cut paper) or one rolled in a roll form (roll paper). Further, the sheet material may be a single material or a sheet material obtained by bonding two or more sheet materials to each other. In this description, the description is made of the sheet material cut into predetermined dimensions as an example.

The sheet material information includes all the information related to the sheet material required for the sheet material processing. Particularly important elements include the physical property and shape, and various pieces of information related thereto. The various pieces of information include at least one of the following: a thickness of the sheet material, density, elastic modulus, viscosity, vibration characteristic, irregularity, surface roughness, state, deformation state, strength, easiness of elastic deformation and plastic deformation, stretch amount, color tone, color change, and reflectance. Deformation (stretching, bending, crushing, damaging, folding, etc.), transmittance, state of curling, permeability of a gas or a liquid, thermal property such as heat diffusivity or heat capacity may also be included. In a case of using paper, the examples of information includes information on irregularity of fibers, a filler amount or a coat layer.

A water content gives a great effect to physical characteristics and a shape of the sheet material, so the water content is a particularly important attribute. Another important sheet material information is information on an embedded component affecting the physical property. A list of examples of the embedded component includes elements such as an ID tag and natural objects such as pressed flowers and leaves. The other examples of the important sheet material information include information on an image which has been formed, adhesion of a foreign substance, dirt, a size and shape of media or a fold at an end portion, a working state such as cutting or drilling, lamination or coating or adhesion of a staple. Further, there are also other examples of the important information including bonding of some pieces of media to each other in an in-plane direction, and whether or not two or more of them entirely or partially overlap each other.

A first method of detecting sheet material information is a method in which an impact force is applied to a sheet material using an external force application member as described in Embodiment 1, and reaction of the sheet material is detected by a pressure-sensitive element. As a result, local bending rigidity and compression rigidity can be detected, and mechanical property of the sheet material can be detected.

In this case, as the pressure-sensitive element, an element capable of detecting pressure or acceleration, such as a piezoelectric element, a piezoresistance element, an electrostatic capacity acceleration sensor, or a magnetic sensor is appropriately used. For the application of the impact force, the external force application member of a certain mass is allowed to impact the sheet material in a state where an appropriate speed and acceleration are maintained. A material, shape, mass, impact speed, and acceleration of the external force application member are appropriately determined according to a type and range of the sheet material as an object of detection. Desirable examples of paper for use in a copying machine used for detection include normal paper, coat paper, bond paper, recycled paper, and resin sheets such as OHT.

The desirable material and shape of the external force application member are those causing minimum wear due to impacting with the sheet material or contacting involved therein, and minimum plastic deformation and elastic deformation, and having high toughness and causes no crack. Specifically, as the material, a metal material such as stainless steel is desirably used. As the shape, a spherical shape or a bar shape is desirable, and a distal end portion thereof impacting the sheet material desirably has a curved surface. By providing the curved surface, even in a case where an impact angle is changed due to vibration of the external force application member or sheet material at the time of impact, stable impact application is possible, and local wear is reduced, so an even impact application is realized. A part of the curved surface may be provided with a flat portion. By allowing the flat portion to impact the sheet material, the sheet material at an impact portion is evenly compressed, so an error resulting from unevenness of the sheet material can be reduced.

The mass, the impact speed, and the acceleration of the external force application member is appropriately determined in consideration to rigidity of the sheet material within a range in which the external force application member does not leave impression on the sheet material. A desirable range for the detection of the sheet material (paper) for use in the image forming apparatus 300 is mass of about 1 g to 10 g and impact speed of about 0.1 m/sec to 1 m/sec. Further, the acceleration at the time of impact is desired to be as small as possible. This is because, even in a case where a moving distance until the external force application member impacts the sheet material depending on dispersion in thickness of the sheet materials or fixation accuracy of the sheet material information detection apparatus, the impacting at a stable speed can be realized. While depending on the impact speed, variation in speed of the acceleration is desirably within a range of 5% or less, more desirably, 1% or less for the moving distance of 1 mm. In order to reduce the acceleration, acceleration by an acceleration unit, acceleration/deceleration by the gravity, and deceleration due to resistance caused by friction or the like are used while appropriately compensating for one another.

The application of the external force through the impact may be performed once or a plurality of times for one time of sheet material information detection. Further, the application may be performed in a plurality of positions at the same time, or may be performed intermittently. In a case where the plurality of times of impact application is performed, it is desirable that by applying impact forces of the same value, the output value be equalized to enhance the accuracy. Further, by applying the impact forces of different values to a single sheet material, a plurality of physical property values of the sheet material can be detected.

There may be provided a mechanism for deflecting or compressing the sheet material by the external force application. For the mechanism for deflecting the sheet material, in a position opposing the external force application member through the intermediation of the sheet member, a step structure such as a groove structure (recess structure) is provided. For the mechanism for compressing the sheet material, in a position opposing the external force application member through the intermediation of the sheet member, an external force receiving member for receiving the external force is provided. The groove structure and the external force receiving member may be integrated to each other, or may be separated from each other. The sheet material may be deflected while being supported only at one side or both sides. Further, a part of the sheet surface may be deflected to be a recess. Note that, in a case where an external force detection mechanism is directly connected to the external force application member to detect a repulsive force of the sheet material, the external force receiving member is not necessarily required.

A second method of detecting sheet material information is a method of detecting the deflection of the sheet material when the impact force is applied to the sheet material by a displacement detection element. The sheet material has elasticity and flexibility, so displacement according to mechanical property of the sheet material is caused by the impact force. The displacement of the sheet material is measured by the displacement detection element, and mechanical property of the sheet material can be detected from a displacement amount, displacement speed, and acceleration of the sheet material. As the displacement detection element, the pressure-sensitive element as described above may be used. The pressure-sensitive element is bonded to a mechanical displacement member (plate-spring like cantilever or the like) to be brought into contact with the sheet material, so the displacement can be measured from the output of the pressure-sensitive element. As a matter of course, the displacement of the sheet material may be measured from transmittance and reflection of light or sound without mechanical contact by applying the light or sound to the sheet material by an optical element or an acoustic element.

A third method of detecting sheet material information is a method in which vibration is applied to the sheet material, and reaction of the sheet material is detected by the pressure-sensitive element. For example, the sheet material is sandwiched between the external force application member causing vibration and the external force detection member to which the pressure-sensitive element is fixed, vibration is applied by the external force application member, and the vibration is detected by the pressure-sensitive element through the intermediation of the sheet material. As a result, reduction, change in phase and transmission time period of the vibration through the sheet material are measured, to thereby detect mechanical property of the sheet material. Various arrangement relations among the external force application member, the external force detection member, and the sheet material are adopted.

In addition, a force of vibration or a frictional force may be detected by applying a transport force as the external force and rubbing a surface of media with a probe. Alternatively, property may be detected by imparting a wave motion such as light or acoustic wave, and detecting a wave motion after reflection or transmission.

The retraction which weakens restraint of the sheet material means to move a part or an entire portion of the sheet material information detection apparatus in a direction of widening a gap between the part or the entire portion thereof and the sheet material. For a specific example, through the retraction, a gap between the external force application member and the external force detection member, which are opposed to each other through the intermediation of the transport path for the sheet material, is widened. For another example, the external force application member or the external force detection member is displaced outwardly of the transport path for the sheet material. For still another example, fixation of the external force application member or the external force detection member is loosened or released, and when a force is applied from the sheet material, the external force application member or the external force detection member can be displaced outwardly of the transport path. It is desirable that, after the end of the retraction operation, a retracted state be retained until the electric power supply to the driving unit is resumed, and the state be returned to an original restraining state when the electric power supply is resumed.

When the electric power supply to the driving unit stops, a member which restrains (or which may restrain) the sheet material is desirably moved in the direction of widening a gap between the member and the sheet material. The movement may actively be performed by using a driving force other than from the power source from which power is supplied to the driving unit. Alternatively, there may be provided a mechanism with which fixation may be released or a fixing force may be weakened such that the movement is passively performed when, for example, a force is applied from the sheet material.

As a driving force for causing the retraction, there is used a spring force, the gravity or an electromagnetic force. The driving force for causing the retraction may be continuously applied to perform the retraction when other retaining forces is eliminated due to cutting off of the electric power supply. Alternatively, the driving force may be applied only when the electric power supply is cut off, by a clutch mechanism. Further, when necessary, a stopper is provided to limit a retraction amount.

The retraction amount is set to a distance, which does not cause a damage to the sheet material information detection apparatus and the sheet material processing apparatus due to at least passage and impact of the sheet material. Specifically, the retraction is desirably performed to outside a surface of a guide plate, which is to be brought into contact with the sheet material, the guide plate constituting the transport path for the sheet material. However, in a case where there is provided a mechanism for dissipating a pressure due to the contact with the sheet material, such as a case where a surface of the member of the sheet material information detection apparatus to be retracted, which is adjacent to the sheet material, is structured to be a curved surface, protruding of the curved surface into the transport path may not be a problem. The recovery from the retracted position may automatically be performed together with the recovery of the electric power supply, or may be automatically performed while being led by a reset operation by a user. Alternatively, the recovery from the retracted position may be performed manually by an operator.

In a case where the sheet material information detection apparatus is moved to the retracted state due to the cutting off of the electric power supply, it is preferable that information indicating that the sheet material information detection apparatus is in such a state (hereinafter, referred to as retraction information) be output. The retraction information may be obtained from, for example, a fact that there is no output of a certain level or more from the sheet material information detection apparatus in a predetermined time. This is effective in a case where the electric power supply is performed for the entire sheet material processing apparatus in a normal state, and is particularly effective in a case where supply of the control electric power to the sheet material information detection apparatus is cut off.

The sheet material processing apparatus is not limited to the image forming apparatus 300 illustrated in FIG. 1. For example, the sheet material processing apparatus is an apparatus for recording characters or images on the sheet material. For another example of the sheet material processing apparatus, there are provided an apparatus which transports the sheet material and reads information which is recorded on the sheet material (so called document scanner or the like), a feeding apparatus for feeding paper money or tickets and an apparatus for performing working such as folding or drilling of the sheet material. Further, in a copier, a laser beam printer, and an ink jet printer, which are present representative image forming apparatuses, as a part of the process, curl correction, stacking, sorting for bookbinding, punching or stapling is also generally performed. As described above, in the image forming apparatus, the sheet material processing is performed for all processes until the media which is set is delivered from the image forming apparatus.

Further, another example of the sheet material processing is to read a content recorded on the sheet material. The content recorded on the sheet material may be of any type or form, including images or characters, stamps, magnetically-recorded data, and data recorded on an embedded element.

The sheet material processing apparatus changes, adjusts, or controls the processing condition for the sheet material based on the sheet material information obtained by the sheet material information detection apparatus. An example of the sheet material processing condition is an image forming condition related to transfer of a coloring material mainly including toner for an electrophotographic process and ink of an ink jet printer to the sheet material. The image forming condition is adjusted by changing the image forming condition according to the sheet material information or changing the control condition for image formation. For example, for a sheet material having a small thickness, image formation is performed in a mode appropriate for thin paper, and for a sheet material having a large thickness, image formation is performed in a mode appropriate for thick paper. The desirable image forming condition to be controlled includes, first, a transferring amount of the coloring material. For example, a toner supply amount to the sheet material or an ink adhesion amount is adjusted. The desirable image forming condition to be controlled includes, second, fixing condition for the coloring materials. For example, a fixing temperature or a fixing pressure for the sheet material is adjusted. Note that, the sheet material processing condition is not limited to adjustment of arrangement of images and the transferring condition of the coloring materials.

The determination of the sheet material processing condition is performed in a processor for processing input data and determining an operation of the sheet material processing apparatus. The processor may be mounted on the sheet material processing apparatus, or an external computer may serve as the processor. The sheet material processing apparatus performs the sheet material processing under the sheet material processing condition determined as described above.

Meanwhile, in a case where the electric power supply to the sheet material information detection apparatus is cut off, the detection of the sheet material information becomes impossible. In this case, it is desirable that, for example, a standard condition (default condition) for a proper sheet material processing be prepared in the sheet material processing apparatus, and the sheet material processing be performed under this condition. However, for another example, the sheet material processing may be stopped or suspended. In both cases, it is desirable to provide appropriate information for a user by sounding an alarm or displaying information on repair.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-178771, filed Jun. 28, 2006, which is hereby incorporated by reference herein in its entirety.

What is claimed is:

1. A sheet material information detection apparatus, comprising:

an external force application member for applying an external force to a sheet material;

an external force receiving member for receiving the external force through an intermediation of the sheet material;

a driving unit, to which an electric power is supplied, for driving the external force application member; and a gap control mechanism for widening a gap between at least one of the external force application member and the external force receiving member, and the sheet material when the electric power is reduced.

2. The sheet material information detection apparatus according to claim 1, further comprising a retaining unit for retaining the sheet material in a thickness direction by at least one of an upstream side and a downstream side of the external force application member.

3. The sheet material information detection apparatus according to claim 1, wherein the gap control mechanism automatically returns the gap to a normal state by the electric power when the electric power returns after the gap is widened.

4. The sheet material information detection apparatus according to claim 1, wherein the gap control mechanism comprises a spring member for imparting a force in a direction of widening the gap and a maintaining unit for maintaining the gap against the force of the spring member by the electric power.

5. The sheet material information detection apparatus according to claim 1, further comprising:

an application abnormality detection unit for detecting abnormality related to application of the external force; and a control unit for stopping electric power supply to the driving unit when the application abnormality detection unit detects the abnormality.

6. The sheet material information detection apparatus according to claim 5, further comprising an impact detection unit for detecting an impact force caused when the external force receiving member receives the external force through the intermediation of the sheet material, wherein the application abnormality detection unit detects, as the abnormality, a case where the impact force detected by the impact detection unit is less than a predetermined threshold value.

7. The sheet material information detection apparatus according to claim 1, further comprising:

a transport abnormality detection unit for detecting abnormality related to transportation of the sheet material; and a control unit for stopping electric power supply to the driving unit when the transport abnormality detection unit detects the abnormality.

8. A sheet material processing apparatus, comprising:

the sheet material information detection apparatus according to claim 1;

a processing unit for processing a sheet material whose sheet material information is detected by the sheet material information detection apparatus; and a processing control unit for adjusting at least one of a transport condition and a processing condition for the sheet material in the processing unit according to the sheet material information.

9. The sheet material processing apparatus according to claim 8, wherein, when the control unit detects the abnormality, the control unit outputs abnormality information to the processing control unit.

10. The sheet material processing apparatus according to claim 9, wherein, when the processing control unit receives the abnormality information from the control unit, the processing control unit sets one of the transport condition and the processing condition set in advance regardless of the sheet material information, for the processing unit.

* * * * *